(12) United States Patent
Ahn et al.

(10) Patent No.: US 9,027,205 B2
(45) Date of Patent: May 12, 2015

(54) GEAR CAM MOUNTING DEVICE IN DUAL-HINGE DEVICE FOR A PORTABLE TERMINAL

(75) Inventors: Sung-Ho Ahn, Seoul (KR); Ji-Hoon Park, Gyeonggi-do (KR); Kun-Woo Baek, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 13/532,924

(22) Filed: Jun. 26, 2012

(65) Prior Publication Data
US 2013/0014346 A1    Jan. 17, 2013

(30) Foreign Application Priority Data
Jul. 13, 2011   (KR) .................. 10-2011-0069656

(51) Int. Cl.
E05D 7/00      (2006.01)
H04M 1/02      (2006.01)
G06F 1/16      (2006.01)
E05D 3/12      (2006.01)
E05D 11/06     (2006.01)
E05F 1/12      (2006.01)

(52) U.S. Cl.
CPC .............. *H04M 1/022* (2013.01); *E05D 3/122* (2013.01); *G06F 1/1681* (2013.01); *E05D 11/06* (2013.01); *E05F 1/1223* (2013.01)

(58) Field of Classification Search
USPC .................. 16/354, 386, 282–287, 303, 330; 361/679.3, 679.56
See application file for complete search history.

(56) References Cited

U.S. PATENT DOCUMENTS

| 6,178,598 | B1 * | 1/2001 | Creely et al. ................... 16/342 |
| 6,948,217 | B2 * | 9/2005 | Higano et al. .................. 16/303 |
| 7,401,382 | B2 * | 7/2008 | Luo ................................ 16/303 |
| 7,506,608 | B2 * | 3/2009 | Sato et al. ..................... 116/330 |
| 7,640,044 | B2 * | 12/2009 | Won et al. ................... 455/575.3 |
| 7,810,214 | B2 * | 10/2010 | Feng et al. ..................... 16/348 |
| 2003/0226238 | A1 * | 12/2003 | Baer ............................... 16/354 |
| 2005/0028322 | A1 * | 2/2005 | Baer ............................... 16/354 |
| 2005/0122671 | A1 * | 6/2005 | Homer ......................... 361/681 |
| 2007/0054710 | A1 * | 3/2007 | Pan ............................. 455/575.3 |
| 2009/0070961 | A1 * | 3/2009 | Chung et al. .................... 16/354 |
| 2010/0071159 | A1 | 3/2010 | Myung |
| 2012/0272481 | A1 * | 11/2012 | Ahn et al. ....................... 16/325 |

FOREIGN PATENT DOCUMENTS

| KR | 10-2007-0007942 A | 1/2007 |
| KR | 20-0439610 Y1 | 4/2008 |
| KR | 10-2011-0034189 A | 4/2011 |

* cited by examiner

*Primary Examiner* — Victor Batson
*Assistant Examiner* — Matthew Sullivan
(74) *Attorney, Agent, or Firm* — Cha & Reiter, LLC

(57) ABSTRACT

A gear cam mounting device in a dual-hinge device for a portable terminal is provided, in which first and second hinge shafts provide first and second parallel hinge axes, respectively, first and second gear cams are fixed around the first and second hinge shafts, in engagement with each other, and first and second locking units penetrate respectively through the first and second gear cams in a direction that is perpendicular to the first and second hinge axes, for locking the first and second gear cams to surround the first and second hinge shafts.

9 Claims, 14 Drawing Sheets

GEAR CAM MOUNTING DEVICE IN DUAL-HINGE DEVICE FOR A PORTABLE TERMINAL

CLAIM OF PRIORITY

This application claims priority under 35 U.S.C. §119(a) of the earlier filing date of a Korean Patent Application filed in the Korean Intellectual Property Office on Jul. 13, 2011 and assigned Serial No. 10-2011-0069656, the entire discloser of which is incorporated herein by reference.

BACKGROUND OF THE INVENTION

1. Field of the Invention

The present invention relates to a hinge device in a portable terminal, and more particularly, to a device for fixing gear cams in a dual-hinge device that provides two hinge axes.

2. Description of the Related Art

A portable terminal typically refers to an information providing device such as a cellular phone, a smart phone, a smart pad, a laptop, a Web hard drive, etc. Portable terminals are categorized into a bar type, a folder type, and a sliding type according to their outward appearances. In addition, wearable-type portable terminals have also emerged, including a glasses type and a wrist type, for example.

Among the above types of portable terminals, a folder-type portable terminal is known which is provided with a hinge device that connects two housings in a rotatable manner. The hinge device is configured so as to provide one or two hinge axes. Accordingly, a single-hinge device or a dual-hinge device can be adopted for use in the portable terminal.

In general, when a hinge device as used in a folder-type portable terminal a cam unit (a driving cam and a driven cam) and an elastic member are typically included so that a stopping force may be applied to a rotating housing at a specific angle and the portable terminal may semi-automatically be opened or closed. This semi-automatic convenience is provided to the user as a result of a cam motion between the driving cam and the driven cam of the cam unit. To allow a user to conveniently open or close the portable terminal, a closing force should be applied continuously in a closed state, an opening force should be applied at or above a predetermined first angle, and a stopping force should be applied at a predetermined second angle.

An exemplary dual-hinge device for a portable terminal is disclosed in Korea Patent Publication No. 2011-34189, in Korea Patent Publication No. 2007-7942, and in U.S. Patent Publication No. 2007-54710.

With reference to FIGS. 1 to 5, the gear cam mounting mechanism of a conventional dual-hinge device will be described below.

Referring to FIGS. 1 and 2, a conventional dual-hinge device 70 includes first and second hinge units, thus providing two parallel hinge axes, that is, first and second hinge axes A1 and A2. A guide bushing 71 is installed at one side of the first and second hinge units and a Flexible Printed Circuit Board (FPCB) guide 72 is installed at the other side of the first and second hinge units. The first hinge unit includes a first gear cam 73, a first cam follower 74, and a first elastic member 75, whereas the second hinge unit includes a second gear cam 76, a second cam follower 77, and a second elastic member 78. As a rotational housing (not shown) rotates, the gear cams 73 and 76 rotate and the cam followers 74 and 77 move back and forth in a linear reciprocal motion along a respective one of a first hinge shaft S1 and a second hinge shaft S2, as a result of cam motion with the gear cams 73 and 76. Reference characters F1 and F2 denote top and bottom frames, respectively.

Referring to FIG. 3, because the first gear cam 73 is fixedly attached so as to surround the first hinge shaft S1, the first gear cam 73 rotates along with rotation of the rotational housing. A first locking member 80 formed on the first hinge shaft S1 b insert molding is inserted into the first gear cam 73, so as to provide the fixed attachment of the first hinge shaft S1 to the first gear cam 73. A locking protrusion 81 is extended from an outer surface of the first locking member 80 along the direction of the first hinge axis A1 and a locking groove (not shown) having height, width and length dimensions that correspond with the height, width and length dimensions of the locking protrusion 81 is formed in an inner surface of the first gear cam 73 along the direction of the first hinge axis A1, which locking groove allows the first locking protrusion 81 to be inserted therein. With this arrangement, when the first gear cam 73 is inserted by a press fit over the first locking member 80, the first gear cam 73 becomes locked to the first locking member 80 so that the first gear cam 73 can rotate along with rotation of the first hinge shaft S1.

Because the first locking protrusion 81 and the locking groove (not shown) are extended along the direction of the first hinge axis A1, the first gear cam 73 rotates along with a rotating motion made around the first hinge axis A1. The second gear cam 76 is also fixed by the same gear cam mounting mechanism of the first gear cam 73.

Referring to FIGS. 4 and 5, when the first and second gear cams 73 and 74 rotate in engagement with each other, their teeth areas are engaged with their non-teeth areas during the rotation.

As stated before, the locking members are insert-molded to the hinge shafts in the dual-hinge device having the above-described configuration. Because the portable terminal is prone to frequent impacts as a result of being dropped, the impacts are transferred to the dual-hinge device. As each impact is subsequently transferred to the hinge shafts to which the locking members are fixed by insert molding, the locking members and the gear cams are progressively deformed or damaged. Even more destructive is that the impact adversely affects the tilting function of the rotational housing.

In addition, the conventional dual-hinge device does not have an structure to prove a stopper function. Accordingly, in the event of excessive rotation, the engagement structure between the locking members and the gear cams is adversely affected, thereby damaging the locking members and the gear cams.

Thus, there exists a need for reinforcing the structural strength of the engagement structure between a locking member and a gear cam in a dual-hinge device of a portable terminal to withstand dropping impacts and excessive rotational forces applied to the dual-hinge device.

SUMMARY OF THE INVENTION

One aspect of the present invention is to address at least the problems and/or disadvantages described above and to provide at least the advantages described below. Accordingly, an aspect of the present invention is to provide a gear cam mounting device which is reinforced by providing strength to a gear cam mounting structure in a dual-hinge device of a portable terminal.

Another aspect of the present invention is to provide a gear cam mounting device having a plurality of stoppers disposed at appropriate positions about the gear cam, for preventing excessive rotation of the gear cam in a dual-hinge device of a portable terminal, as a result of cooperative engagement of the plurality of stoppers, thus preventing the dual-hinge device from being damaged.

In accordance with an embodiment of the present invention, there is provided a gear cam mounting device in a dual-hinge device for a portable terminal, in which a first hinge shaft provides a first hinge axis, a second hinge shaft provides a second hinge axis which is parallel to the first hinge axis, a first gear cam is mounted so as to surround the first hinge shaft, a second gear cam is mounted so as to surround the second hinge shaft and be in a mesh engagement with the first gear cam, a first locking unit is provided for penetrating through the first gear cam in a direction perpendicular to the first hinge axis, so as to lock the first gear cam around the first hinge shaft, and a second locking unit is provided for penetrating through the second gear cam in a direction perpendicular to the second hinge axis, so as to lock the second gear cam around the second hinge shaft.

In accordance with another embodiment of the present invention, there is provided a gear cam mounting device in a hinge device for a portable terminal, in which a hinge shaft provides a hinge axis, a gear cam is fixed around the hinge shaft, and a locking pin penetrates through the gear cam in a direction perpendicular to the hinge axis, so as to lock the gear cam around the hinge shaft.

In accordance with another embodiment of the present invention, there is provided a gear cam mounting device in a hinge device for a portable terminal, in which a first hinge shaft provides a first hinge axis, a first opening is formed into the first hinge shaft, the first opening extending in a direction perpendicular to the first hinge axis, a first locking key is installed to have a first part inserted into the first opening and a part protruding in a direction perpendicular to the first hinge axis, and a first gear cam is inserted over the first locking key, thereby fixing the first gear cam around the first hinge shaft.

In accordance with a further embodiment of the present invention, there is provided a gear cam mounting device in a dual-hinge device for a portable terminal, in which a shaft guide bracket is installed, a first hinge shaft is supported by the shaft guide bracket and provides a first hinge axis, a second hinge shaft is supported by the shaft guide bracket and provides a second hinge axis parallel to the first hinge axis, a first gear cam is fixed around the first hinge shaft, a second gear cam is fixed around the second hinge shaft in engagement with the first gear cam, a first stopper is provided at the shaft guide bracket, a second stopper is provided on the first gear cam and restricts rotation in conjunction with the first stopper, a third stopper is provided on the second gear cam and restricts rotation in conjunction with the first stopper, a first locking unit penetrates through the first gear cam in a direction perpendicular to the first hinge axis so as to lock the first gear cam to the first hinge shaft, and a second locking unit penetrates through the second gear cam in a direction perpendicular to the second hinge axis so as to lock the second gear cam to the second hinge shaft.

In accordance with another embodiment of the invention, a method is provided for mounting a gear cam to a hinge shaft in a hinge device for a portable terminal, the method comprising, providing a hinge shaft having a hinge axis, positioning a gear cam so as to surround the hinge shaft, and, providing a locking unit to penetrate through the gear cam in a direction perpendicular to the hinge axis, for locking the gear cam to the hinge shaft.

Other exemplary aspects, advantages and salient features of the invention will become apparent to a person of ordinary skill in the art from the following detailed description, which, taken in conjunction with the annexed drawings, discloses exemplary embodiments of the invention in more detail.

BRIEF DESCRIPTION OF THE DRAWINGS

The above features and advantages of certain embodiments of the present invention will be more apparent from the following detailed description taken in conjunction with the accompanying drawings, in which.

DETAILED DESCRIPTION

The following description, with reference to the accompanying drawings, is provided to assist a person of ordinary skill in the art with a comprehensive understanding of exemplary embodiments of the invention. The description includes various specific details to assist in that understanding but these details are to be regarded as merely exemplary. Accordingly, those of ordinary skill in the art will recognize that various changes and modifications of the exemplary embodiments described herein can be made without departing from the spirit of the invention and the scope of the appended claims. Also, descriptions of well-known functions and constructions may be omitted for clarity and simplicity so as not to obscure appreciation of the present invention by a person of ordinary skill with such well-known functions and constructions.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purposes only and not for the purpose of limiting the invention as defined by the appended claims.

It is to be understood that the singular forms "a", "an", and "the" include plural references unless the context clearly dictates otherwise. Thus, for example, reference to "a component surface" typically includes reference to one or more of such surfaces.

Finally, the term "substantially" typically means that the recited characteristic, parameter, or value need not be achieved exactly, but that deviations or variations, including for example, tolerances, measurement error, measurement accuracy limitations and other factors known to those skilled in the art, may occur in amounts that do not preclude the effect the characteristic was intended to provide.

Figure 1:
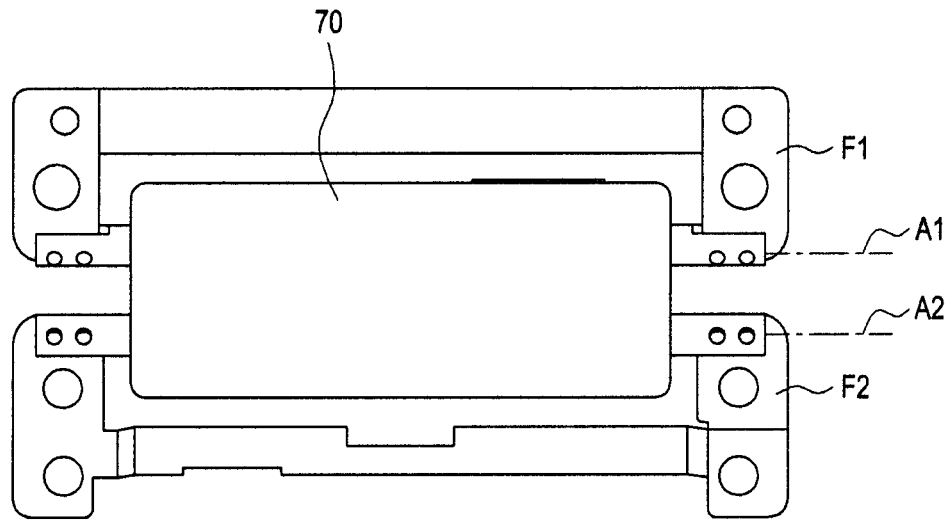
FIG. 1 is a plan view which illustrates the exterior of a prior art dual-hinge device.
Figure 2:
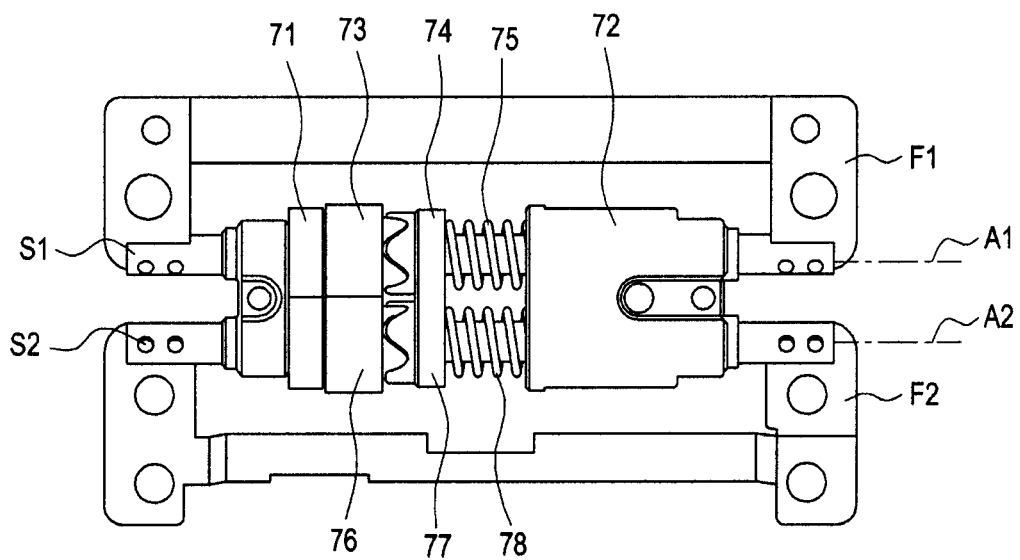
FIG. 2 is a plan view which illustrates the prior art dual-hinge device with the exterior of the hinge housing removed so as to expose details of the dual-hinge device.
Figure 3:
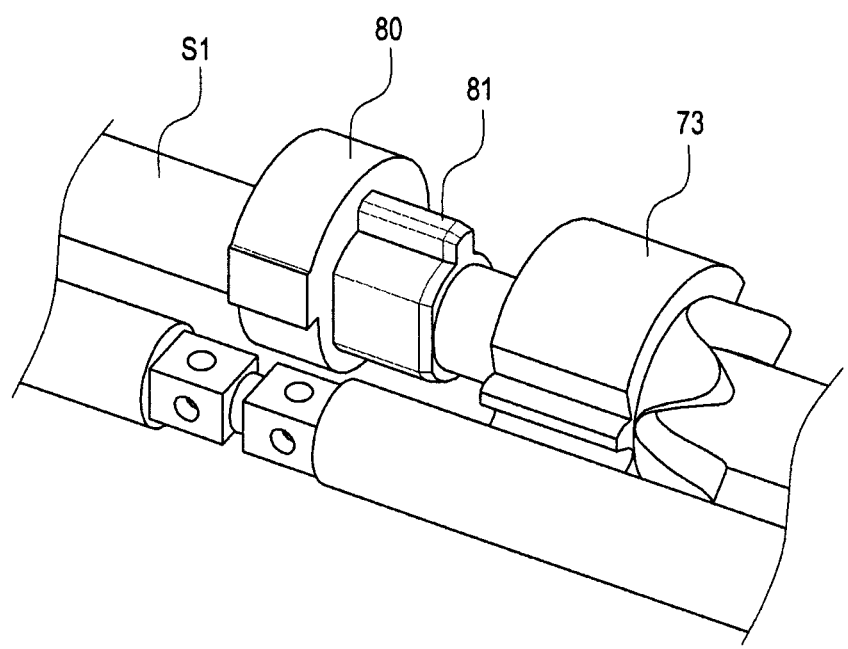
FIG. 3 is a perspective view which illustrates a gear cam mounted in the prior art dual-hinge device.
Figure 4:
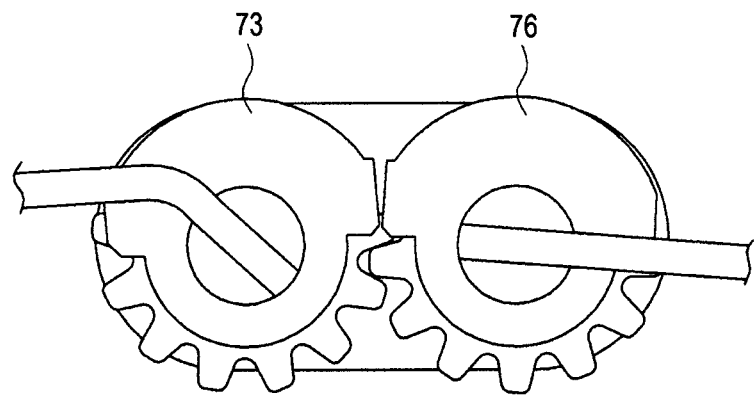
FIGS. 4 and 5 are sectional views which illustrates locking members and gear cams that are rotating in engagement with each other in the prior art dual-hinge device.
Figure 5:
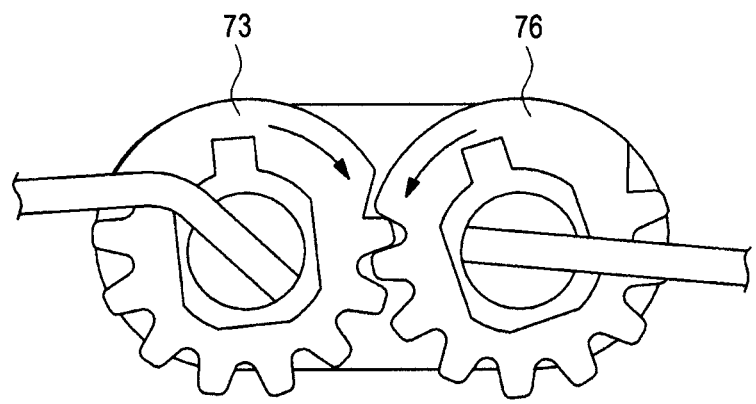
Figure 6:
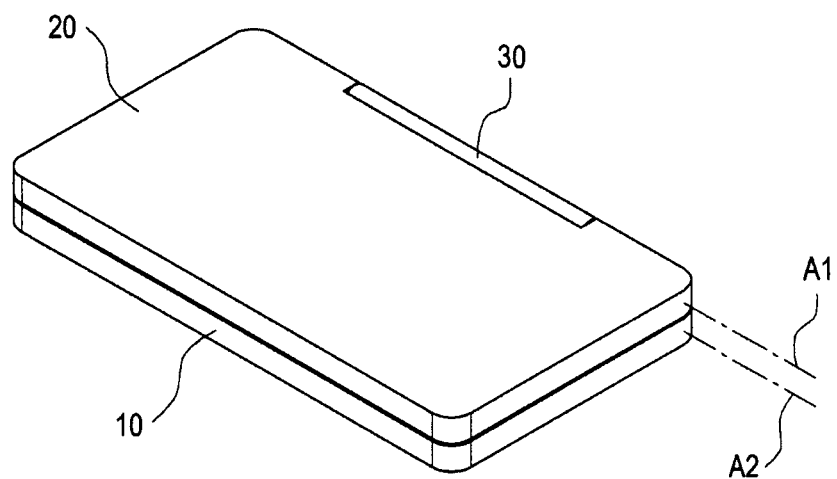
FIG. 6 is a perspective view which illustrates a portable terminal having a dual-hinge device in a closed state according to the present invention.
Figure 7:
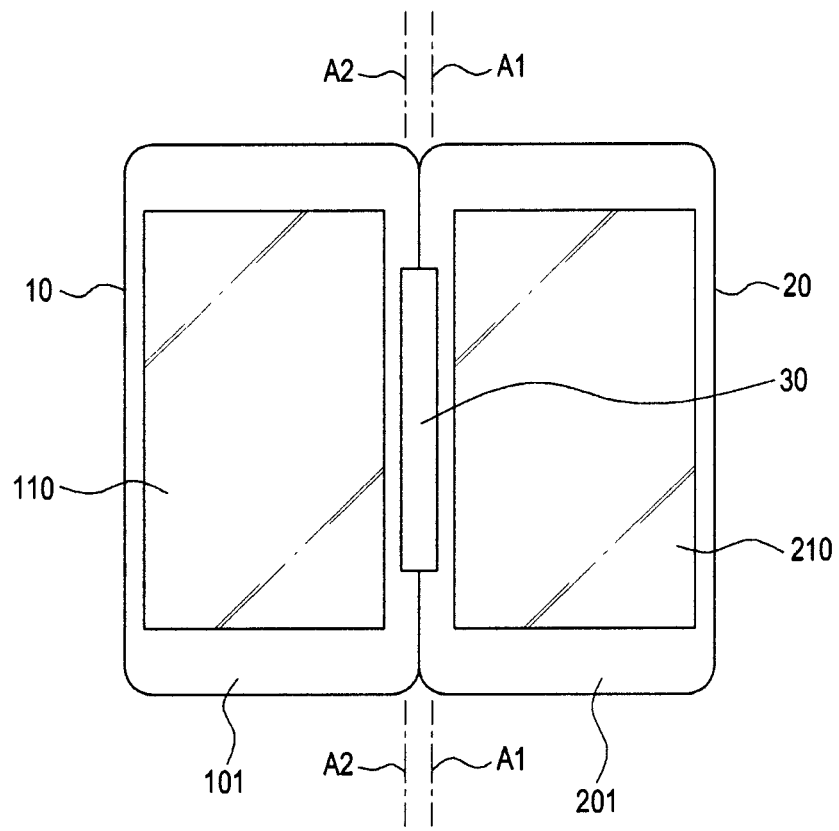
FIG. 7 is a plan view which illustrates the portable terminal having the dual-hinge device in a fully opened state according to the present invention.

FIGS. 6 and 7 illustrate a portable terminal having a dual-hinge device 30 according to the present invention. Specifically, FIG. 6 illustrates the portable terminal in a closed state and FIG. 7 illustrates the portable terminal in an open state.

Referring to FIGS. 6 and 7, the portable terminal includes a first housing 10, a second housing 20, and the dual-hinge device 30 for connecting the second housing 20 to the first housing so that they are rotatable about first and second hinge axes A1 and A2. It is noted that only an outer housing (upper and lower hinge housings 31a and 31b shown in FIG. 10) of the dual-hinge device 30 is shown in FIGS. 6 and 7.

The first housing 10 of the portable terminal has a data input or Input/Output (I/O) unit 110 on its inner surface 101, and the second housing 20 has a data output or I/O unit 210 on its inner surface 201. The data input unit 110 may be configured as a keypad and the data output unit 210 may be configured as a display. Furthermore, the data I/O unit 110 or 220 may alternatively be configured into as a touch screen.

Figure 8:
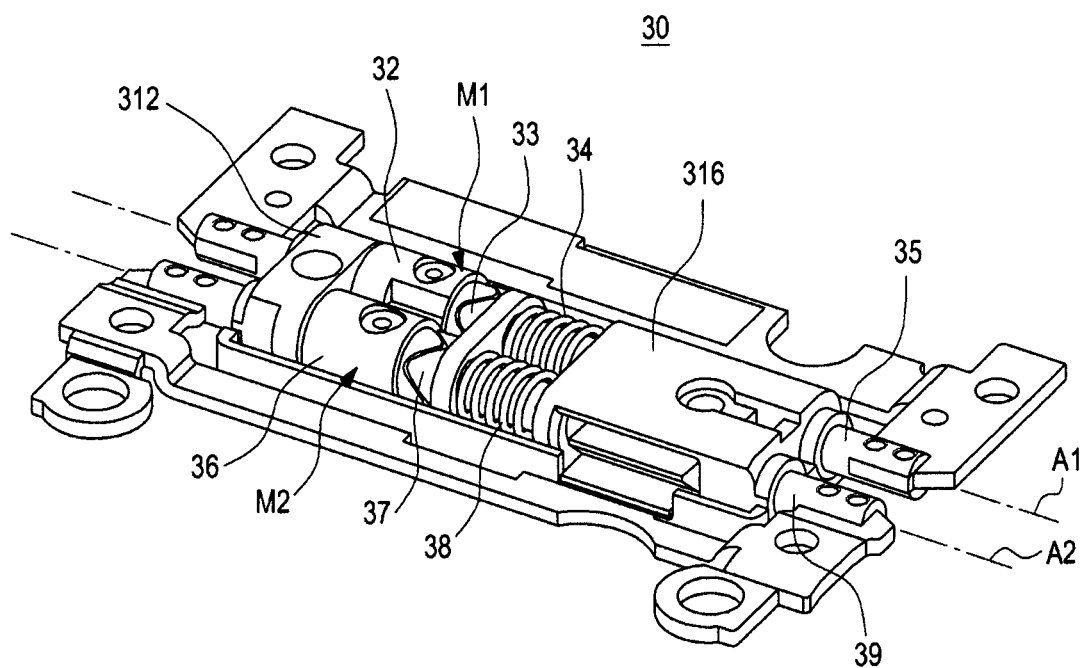
FIG. 8 is an assembled top perspective view which illustrates the dual-hinge device having a gear cam mounting device according to an embodiment of the present invention.
Figure 9:
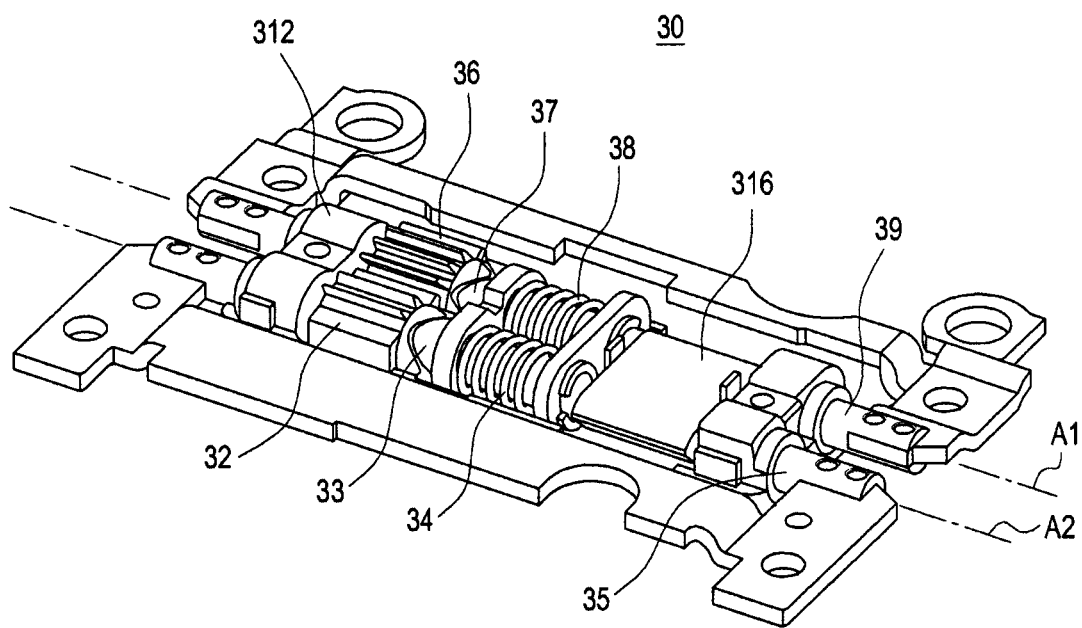
FIG. 9 is an assembled bottom perspective view which illustrates the dual-hinge device of FIG. 8.
Figure 10:
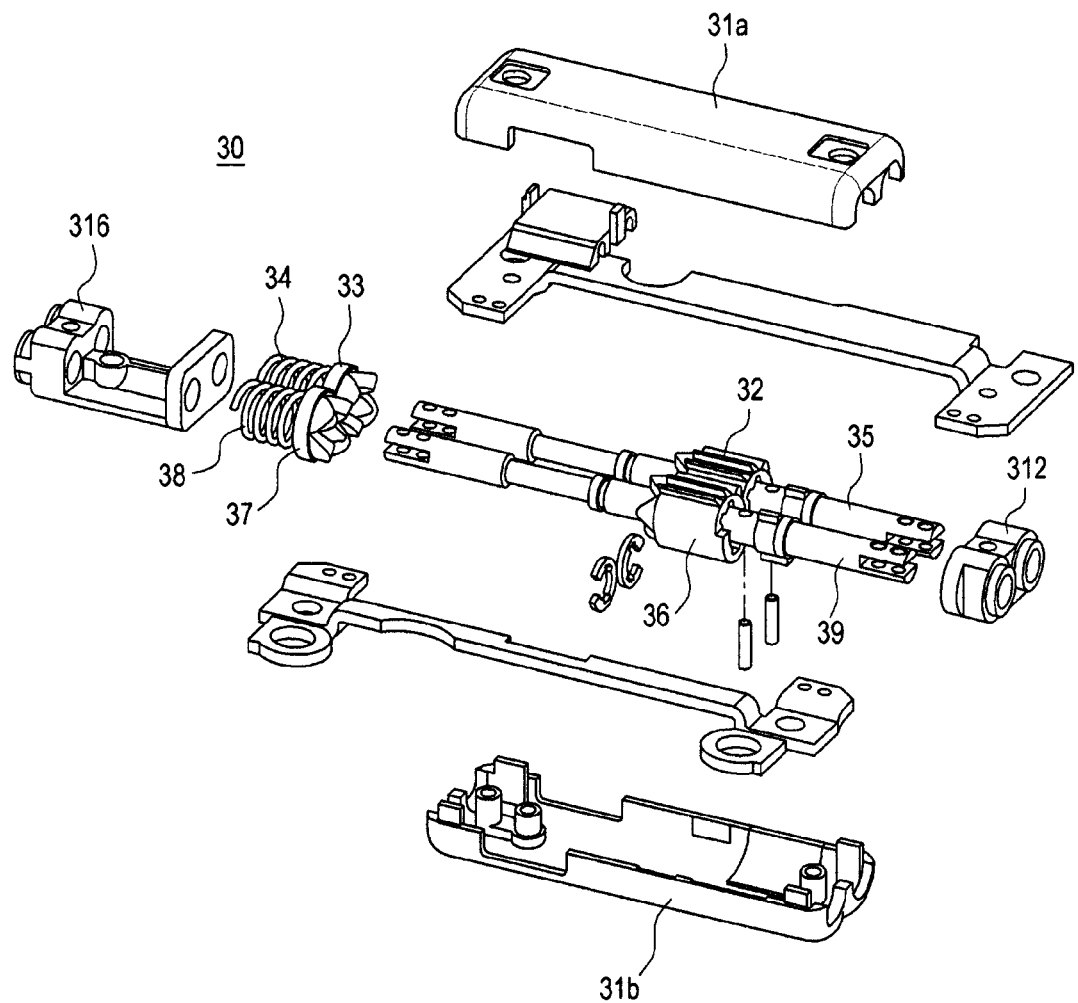
FIG. 10 is an exploded perspective view which illustrates a mirror image the dual-hinge device of FIGS. 8 and 9.

With reference to FIGS. 8, 9 and 10, the structure of the dual-hinge device will be described below. The dual-hinge device 30 includes a first hinge unit M1, a second hinge unit M2, a shaft guide bracket 312, and a Flexible Printed Circuit Board (FPCB) guide 316. The first and second hinge units M1 and M2 are arranged in parallel between the shaft guide bracket 312 and the FPCB guide 316. The first hinge unit M1 provides the first hinge axis A1 and the second hinge unit M2 provides the second hinge axis A2 parallel to the first hinge axis A1. The first and second hinge units M1 and M2 are positioned in parallel within upper and lower hinge housings 31a and 31b.

As described above, the dual-hinge device 30 includes the first and second hinge units M1 and M2. The first hinge unit M1 includes a first gear cam 32 for rotating around the first hinge axis A1 concurrently with rotation of the second housing (20 in FIG. 6), and the second hinge unit M2 includes a second gear cam 36 engaged with the first gear cam 32. The first hinge unit M1 further includes a first cam follower 33 for moving linearly along the first hinge axis A1 concurrently with rotation of the first gear cam 32, and the second hinge unit M2 further includes a second cam follower 37 for moving linearly along the second hinge axis A2 concurrently with rotation of the second gear cam 36.

A first elastic member 34 urges the first gear cam 32 into close face-to-face contact with the first cam follower 33, so that as the first gear cam 32 rotates, the first cam follower 33 is caused to move along the first hinge axis A1, simultaneously with a cam motion with the first gear cam 32.

A second elastic member 38 urges the second gear cam 36 into close face-to-face contact with the second cam follower 37, so that as the second gear cam 36 rotates, the second cam follower 37 is caused to move along the second hinge axis A2, simultaneously with a cam motion with the second gear cam 36. While the first and second cam followers 33 and 37 are shown as integrally formed in FIGS. 8, 9 and 10, this is purely exemplary. Thus, the first and second cam followers 33 and 37 may be configured separately. Each of the first and second gear cams 32 and 36 has a plurality of cam grooves and cam protrusions (e.g. "teeth") on its cam surface, and each of the first and second cam followers 33 and 37 also has a plurality of cam grooves and cam protrusions on its cam surface.

Figure 11:
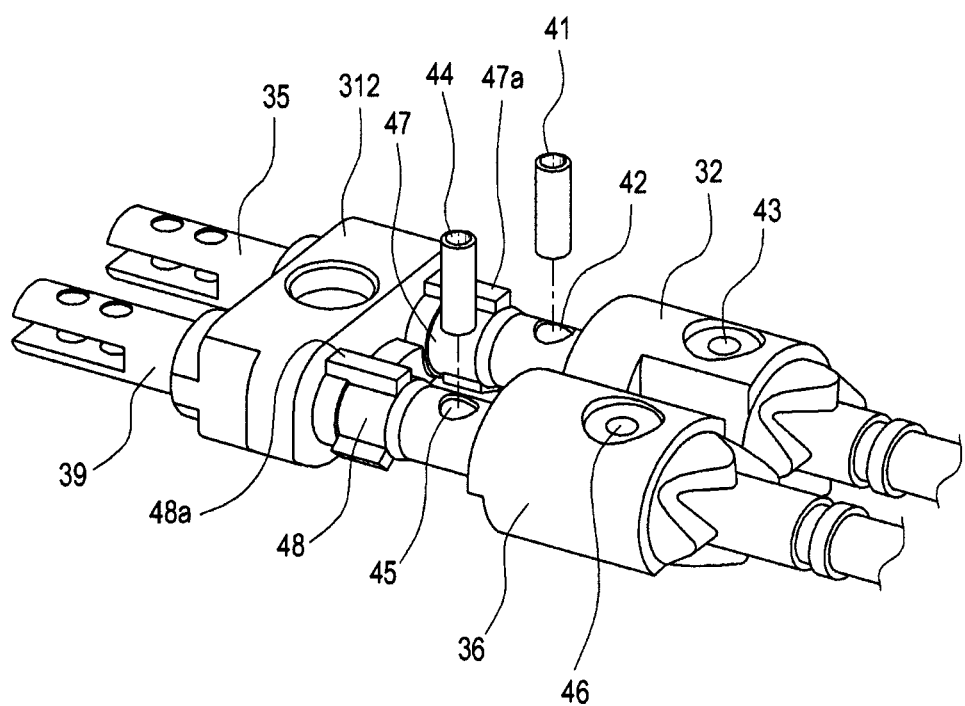
FIG. 11 is an exploded perspective view which illustrates in more detail the gear cam mounting device of FIGS. 8 and 9.
Figure 12:
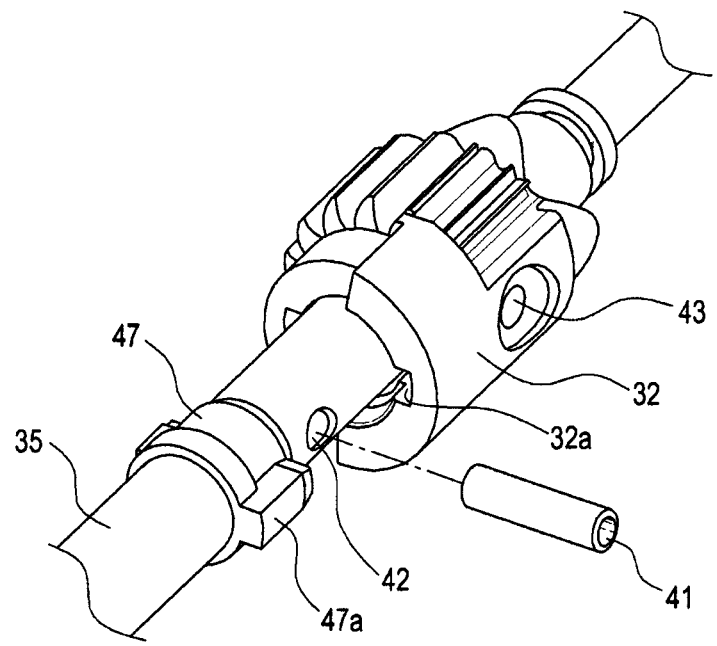
FIG. 12 is an exploded perspective view which illustrates the gear cam mounting device according to the embodiment of the present invention, taken from a direction different from the direction in which the gear cam mounting device is viewed in FIG. 11.
Figure 13:
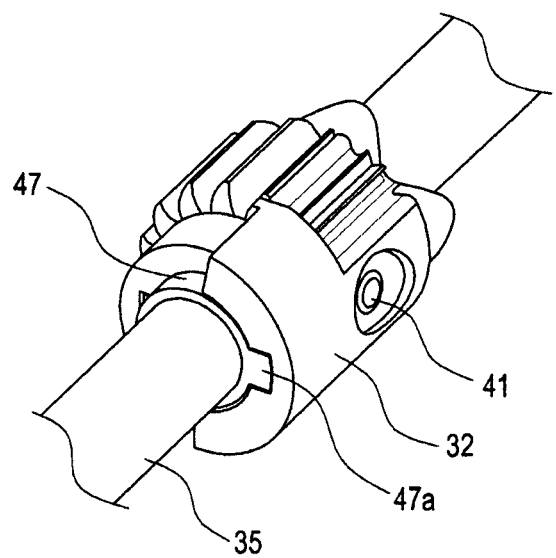
FIG. 13 is an perspective view which illustrates the gear cam mounting device according to the embodiment of the present invention, taken after the exploded parts shown in FIG. 12 have been assembled.

FIGS. 11 and 12 illustrate exploded views and FIG. 13 and assembled view of a mechanism for mounting the gear cams 32 and 36 to first and second hinge shafts in accordance with principles of the present invention. The first and second gear cams 32 and 36 are fixedly attached so as to surround first and second hinge shafts 35 and 39, respectively. More specifically, the first and second gear cams 32 and 36 are fixed primarily by later-described first and second locking members 47 and 48 and secondarily by later-described locking units. The first and second locking members 47 and 48 fixedly fit around the first and second hinge shafts 35 and 39, respectively, as a result of being attached firmly thereto by insert molding (a manufacturing process that injects materials, typically thermoplastics, into molds that surround component parts). The first and second locking members 47 and 48 are symmetrically shaped and positioned so as to fit around the first and second hinge shafts 35 and 39. The first and second gear cams 32 and 36 each include a recess centrally located therein that has an inner shape dimensioned to correspond with the outer shape of a portion of the first and second locking members 47 and 48, respectively, so that when the first and second gear cams 32 and 36 are pressedly inserted over a portion of the first and second locking members 47 and 48, respectively, a tight fit results and the completed assembly will rotate together with rotation of the first and second hinge shafts 35 and 39, respectively.

The first and second locking members 47 and 48 each include first and second locking protrusions 47a and 48a that protrude in a radial direction relative to the first and second hinge axes A1 and A2. The first and second gear cams 32 and 36 each include a first locking groove 32a and a second locking groove (not shown) formed in the radial direction relative to the first and second hinge axes A1 and A2, for being pressedly inserted over the locking protrusions 47a and 48a.

The first locking groove 32a and second locking groove are of the same shape. The first and second locking protrusions 47a and 48a, the first locking groove 32a, and the second locking groove are extended along the direction of the first and second hinge axes A1 and A2. The first and second gear cams 32 and 36 are integrally mounted around the first and second locking members 47 and 48 by pressing the first and second locking protrusions 47a and 48a into the first locking groove 32a and the second locking groove, respectively.

First and second locking units, to be described next, are constructed according to the same configuration. Thus, in the interest of clarity and brevity, in the remainder of the description only the first locking unit will be described in detail.

The first locking unit includes a first opening 42, a second opening 43, and a locking pin 41. The first opening 42 is formed into the first hinge shaft 35 and extends in a direction perpendicular to the direction of the first hinge axis A1. The second opening 43 is formed into the first gear cam 32 and extends in a direction perpendicular to the direction of the first hinge axis A1. The first locking pin 41 is pressed into the first and second openings 42 and 43, thereby fixing the first gear cam 32 around the first hinge shaft 35.

Once the first locking pin 41 is pressed into the first and second openings 42 and 43 which extend in a direction perpendicular to the direction of the first hinge axis A1, the first gear cam 32 will rotate simultaneously with rotation of the first hinge shaft 35. A particular advantage of the present arrangement is that the engagement structure between the first locking member 47 and the first gear cam 32 and the additional engagement structure between the first hinge shaft 35 and the first gear cam 32 (by use of the first locking pin 41), substantially reinforces the strength of the mounting structure of the first gear cam 32, as compared with prior art embodiments.

Referring again to FIG. 11, the first locking pin 41 and a second locking pin 44 fully penetrate through the first hinge shaft 35 and the first gear cam 32 and through the second hinge shaft 39 and the second gear cam 36, respectively. The first and second locking pins 41 and 44 are cylindrical and the first and second openings 42 and 43 are roughly cylindrical. Although in the illustrated embodiments this engagement structure is shown to have a cylindrical shape, there is no need for limiting the shape of the engagement structure to be cylindrical.

The second locking unit is also shown in FIG. 11, where reference character 46 denotes a third opening formed into the second gear cam 36 and reference character 45 denotes a fourth opening formed into the second hinge shaft 39. In a manner similar to that shown and described above for the first locking unit, the second locking pin 44 locks the second gear cam 36 to the second hinge shaft 39.

Now a description will be given of the structure of a device for mounting a gear cam 52 according to another embodiment of the present invention with reference to FIGS. 14 and 15.

Figure 14:
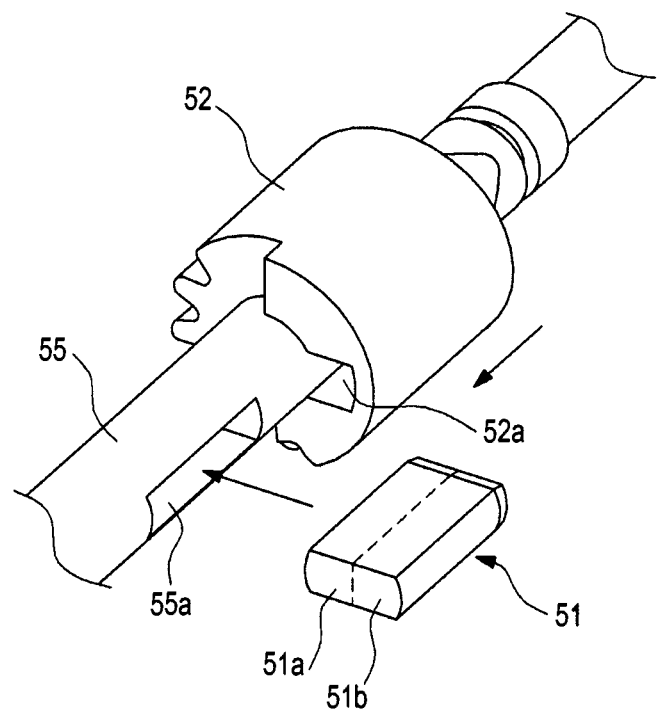
FIG. 14 is an exploded perspective view which illustrates a gear cam mounting device according to another embodiment of the present invention.
Figure 15:
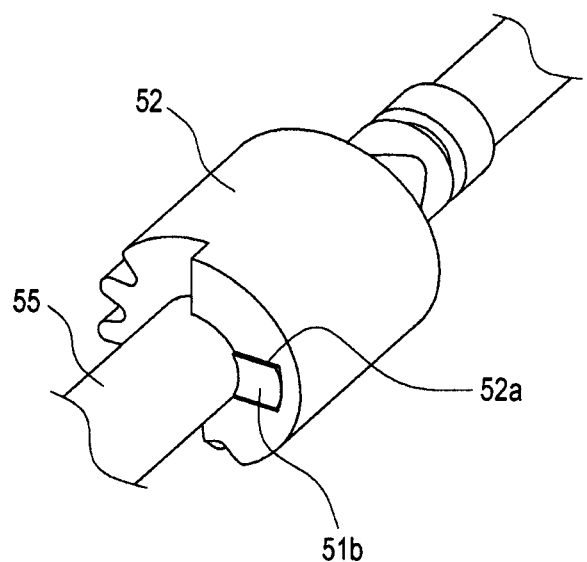
FIG. 15 is an assembled perspective view which illustrates the gear cam mounting device illustrated in FIG. 14.
Figure 16:
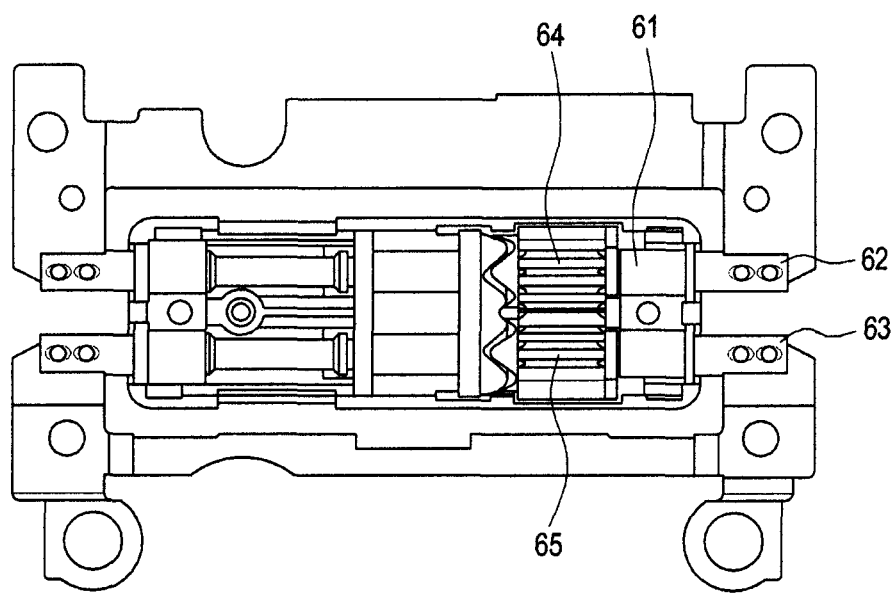
FIG. 16 is a plan view which illustrates a dual-hinge device in which stoppers are added to the gear cam mounting device illustrated in FIGS. 1 to 13.

Referring to FIGS. 14 and 15, the gear cam mounting device includes first and second locking units provided at a first hinge shaft 55 and a second hinge shaft (not shown), respectively. Since the first and second locking units have the same configuration and are arranged symmetrically, the structure and operation of only the first locking unit provided at the first hinge shaft 55 is described in conjunction with FIGS. 14 and 15.

The first locking unit includes the first hinge shaft 55, a first opening 55a, a first locking key 51, and a first gear cam 52. The first hinge shaft 55 extends along the first hinge axis A1. The first opening 55a is formed into the first hinge shaft 55, extending perpendicular to the direction of the first hinge axis A1. The first locking key 51 is inserted or pressed into the first opening 55a, with a part 51a of the first locking key 51 accommodated in the first opening 55a and another part 51b of the first locking key 51 is left so as to be protruding in a direction perpendicular to the first hinge axis A1. The first locking key 51 is provided to be inserted or pressed into the first gear cam 52, thus fixing the first gear cam 52 to the first hinge shaft 55. More specifically, the first gear cam 52 includes a first locking groove 52a for inserting the protruding part 51b of the first locking key 51 therein. The first gear cam 52 is disposed so as to extend along the direction of the first hinge axis A1 and the first locking groove 52a also extends along the direction of the first hinge axis A1. The first locking groove 52a is shaped so as to be in correspondence with the shape of the protruding part 51b of the first locking key 51. To affix the first gear cam 52 to the first hinge shaft 55, the part 51a of the first locking key 51 is first pressed into the first opening 55a and then upon application of pressure, the first gear cam 52 is inserted over protruding part 51b of the first locking key 51. While in the above description a gear cam is mounted around a single hinge shaft using one locking key in FIGS. 14 and 15, the same technique can be applied using two locking keys when two gear cams are to be mounted around two hinge shafts.

FIGS. 16 to 19, describe stoppers which can be used in the above-described gear cam mounting device.

In FIGS. 16 to 19, a gear cam mounting device using stoppers includes a shaft guide bracket 61, first and second hinge shafts 62 and 63, first and second gear cams 64 and 65, and first, second, and third stoppers 61a, 64a, and 65a. The shaft guide bracket 61 is installed to the first and second hinge shafts 62 and 63 for supporting the first and second hinge shafts 62 and 63 in a manner so their first and second hinge axes A1 and A2 are parallel. The first and second gear cams 64 and 65 are fixed around the first and second hinge shafts 62 and 63, respectively, using, for example, one of the previously described locking key or locking pin mounting techniques. Accordingly, in the interest of clarity and brevity, further description for such mounting is not provided herein.

Figure 18A:
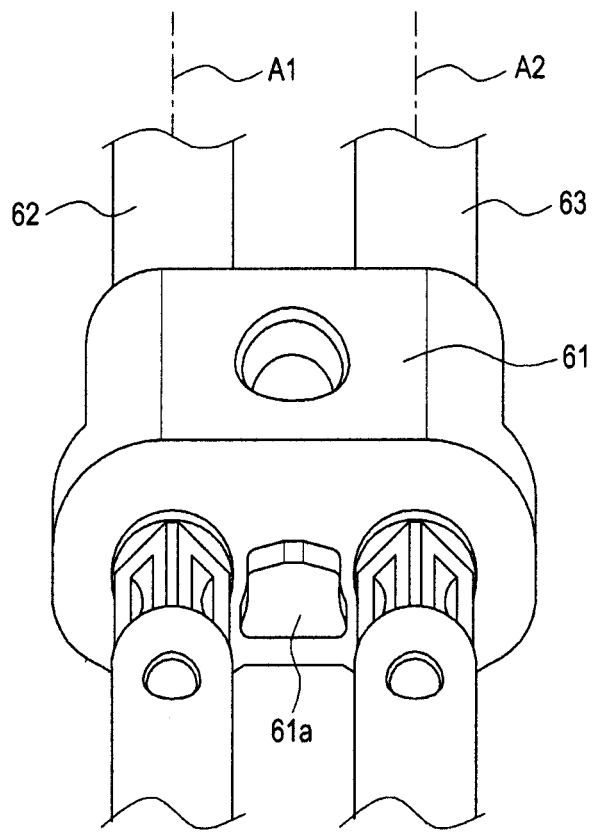
FIG. 18A is a perspective view which illustrates a first stopper formed on a shaft guide bracket in the gear cam mounting device according to the present invention.
Figure 18B:
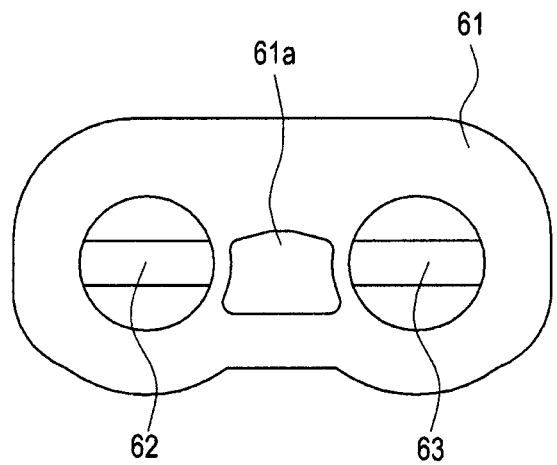
FIG. 18B is a frontal view of FIG. 18A.
Figure 19:
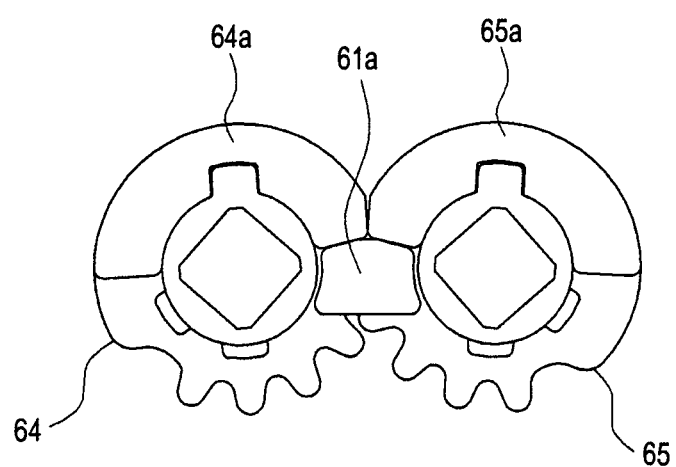
FIG. 19 is a frontal view which illustrates the first and second gear cams whose rotation is restricted by interference of the first stopper shown in FIG. 18 with the second and third stoppers in the gear hinge mounting device according to the present invention.

Referring to FIGS. 18A, 18B and 19, the first stopper 61a is provided at the first shaft guide bracket 61. Specifically, the first stopper 61a is formed on one surface of the shaft guide bracket 61 facing the first and second gear cams, between the first and second hinge shafts 62 and 63. The first stopper 61a is formed integrally with the shaft guide bracket 61 so as to protrudely outwardly toward the first and second gear cams 64 and 65 as shown in FIG. 19.

Figure 17A:
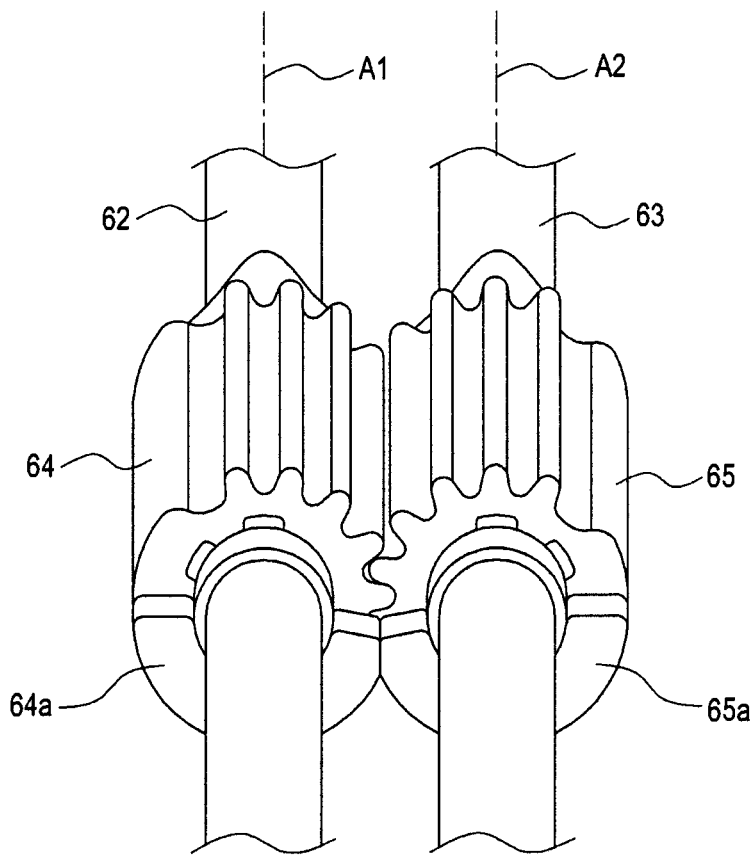
FIG. 17A is a perspective view which illustrates second and third stoppers installed to first and second gear cams in the gear cam mounting device according to the present invention.
Figure 17B:
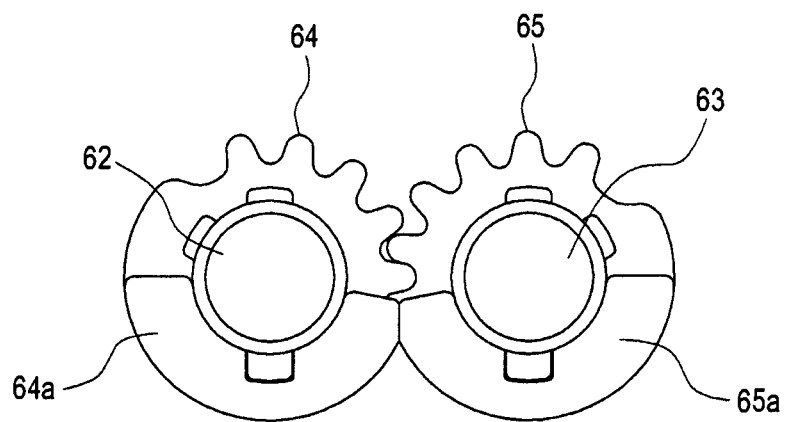
FIG. 17B is a frontal view of FIG. 17A.

Referring to FIGS. 17A, 17B and 19, the second and third stoppers 64a and 65a protrude a predetermined distance from the respective surfaces of the first and second gear cams 64 and 65 that face the shaft guide bracket 61. The second and third stoppers 64a and 65a are formed symmetrically on the surfaces of the first and second gear cams 64 and 65, so as to thereby restrict rotation of the first and second gear cams 64 and 65, upon their contact with the first stopper 61a.

FIG. 19 shows in detail how the first stopper 61a operates in conjunction with the second and third stoppers 64a and 65a to prevent excessive rotation of the first and second gear cams 64 and 65. The second and third stoppers 64a and 65a have a roughly semi-cylindrical shape. In accordance with the above described arrangement, the first and second gear cams 64 and 65 are prevented from rotating excessively, that is past a predetermined range of angular motion, when stoppers 64a and 64b meet stopper 61a, thereby avoiding the need for a separately procured stopping device.

As is apparent from the above description, the present invention reinforces the engagement structure between gear cams and hinge shafts in a dual-hinge device of a portable terminal. Therefore, the tilting function of the portable terminal, which can be severely damaged by successive impacts that result from the portable terminal being dropped, is improved and the lifetime of the portable terminal is increased.

While the present invention has been particularly shown and described with reference to several embodiments thereof, it will be understood by those of ordinary skill in the art that various changes in form and details may be made therein without departing from the spirit and scope of the present invention as defined by the following claims

What is claimed is:

1. A gear gam mounting device in a hinge device for a portable terminal, comprising:
    a first hinge shaft and a second hinge shaft providing a first hinge axis parallel to a second hinge axis;
    a first gear cam surrounding the first hinge shaft and a second gear cam surrounding the second hinge shaft, wherein the first gear cam and the second gear cam are intermeshed;
    a first opening formed in the first hinge shaft and a second opening formed in the first gear cam, the first opening and the second opening extending in a direction perpendicular to the first hinge axis;
    a third opening formed in the second hinge shaft and a fourth opening formed in the second gear cam, the third opening and the fourth opening extending in a direction perpendicular to the second hinge axis; and
    a locking unit including;
        a first locking pin passing through the first opening and second opening, locking the first gear cam to the first hinge shaft, and
        a second locking pin passing through the third opening and fourth opening, locking the second gear cam to the second hinge shaft.

2. The gear cam mounting device of claim 1, wherein a first locking member is attached to the first hinge shaft, a second locking member is attached to the second hinge shaft, the first gear cam is connected to the first hinge shaft when the first locking member is inserted into a recess in the first gear cam, and the second gear cam is connected to the second hinge shaft when the second locking member is inserted into a recess in the second gear cam, the first and second gear cams thus rotating together with the first and second hinge shafts, respectively.

3. The gear cam mounting device of claim 2, wherein the first and second locking members are each directly coupled to the respective one of said first and second hinge shafts by insert molding.

4. The gear cam mounting device of claim 2, wherein the first locking member comprises a first locking protrusion extending in a radial direction relative to the first hinge axis, the second locking member comprises a second locking protrusion extending in a radial direction relative to the second hinge axis, the first gear cam comprises a first locking groove for inserting the first locking protrusion into the first locking groove, the second gear cam comprises a second locking groove for inserting the second locking protrusion into the second locking groove, and the first and second locking protrusions and the first and second locking grooves each extend in a direction parallel to the first and second hinge axes, respectively.

5. The gear cam mounting device of claim 1, wherein the first locking pin is pressed into the first and second openings, fully passing through the first hinge shaft and the first gear cam, and the second locking pin is pressed into the third and fourth openings, fully passing through the second hinge shaft and the second gear cam.

6. A method for mounting a gear cam to a hinge shaft in a hinge device for a portable terminal, comprising:
    providing a first hinge shaft having a first hinge axis and a second hinge shaft having a second hinge axis, the first hinge axis parallel to the second hinge axis;
    positioning a first gear cam surrounding the first hinge shaft and a second gear cam surrounding the second hinge shaft;
    forming a first opening in the first hinge shaft and a second opening in the first gear cam, the first opening and the second opening extending in a direction perpendicular to the first hinge axis;
    forming a third opening in the second hinge shaft and a fourth opening in the second gear cam, the third opening and the fourth opening extending in a direction perpendicular to the second hinge axis;
    coupling the first gear cam to the first hinge shaft with a first locking pin insertably coupled through the first opening and the second opening; and
    coupling the second gear cam to the second hinge shaft with a second locking pin insertably coupled through the third opening and the fourth opening.

7. The method of claim 6, further including the steps of:
    providing a first locking member coupled to the first hinge shaft, the first locking member being inserted into a recess in the first gear cam, the recess having a shape corresponding to a shape of said first locking member.

8. The method of claim 7, wherein the first locking member shape is substantially circular, but has a radial protrusion that extends from an outer periphery thereof.

9. The method of claim 7, further comprising:
    insert molding the first locking member to couple the first locking member to the first hinge shaft.

UNITED STATES PATENT AND TRADEMARK OFFICE
CERTIFICATE OF CORRECTION

| | | |
|---|---|---|
| PATENT NO. | : 9,027,205 B2 | |
| APPLICATION NO. | : 13/532924 | |
| DATED | : May 12, 2015 | |
| INVENTOR(S) | : Sung-Ho Ahn et al. | |

It is certified that error appears in the above-identified patent and that said Letters Patent is hereby corrected as shown below:

In the Claims

Column 9, Claim 1, Line 14 should read as follows:
--…A gear cam mounting…--

Signed and Sealed this
Eleventh Day of August, 2015

Michelle K. Lee
*Director of the United States Patent and Trademark Office*